Oct. 23, 1923. 1,471,968
J. V. MARTIN
VEHICLE SHOCK ABSORBER
Filed Aug. 8, 1922 5 Sheets-Sheet 2

Inventor
James V. Martin

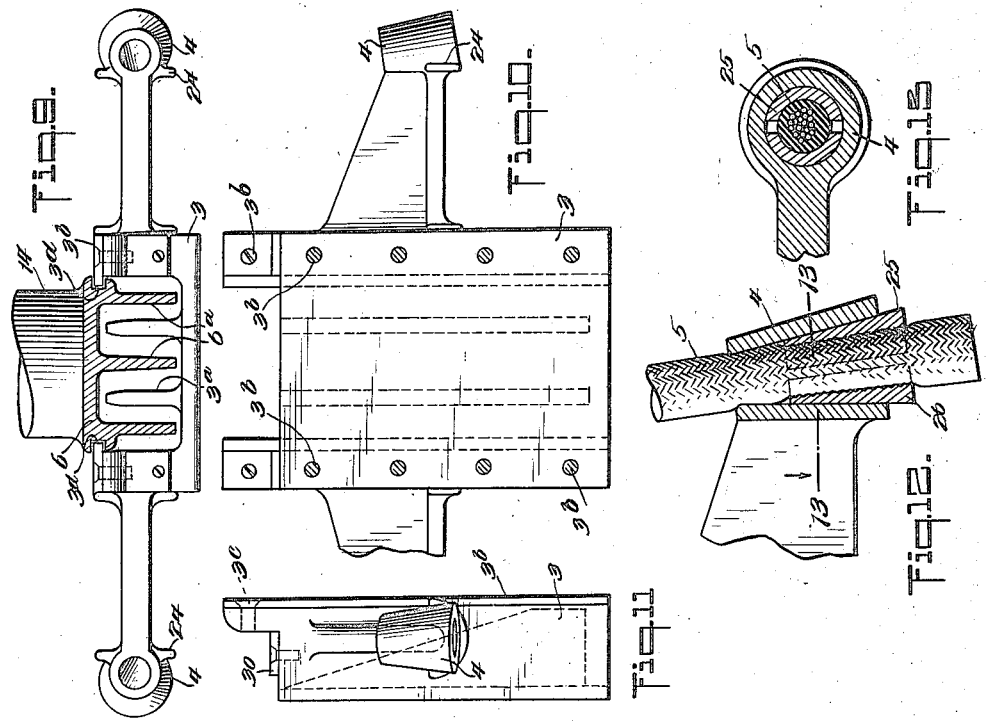
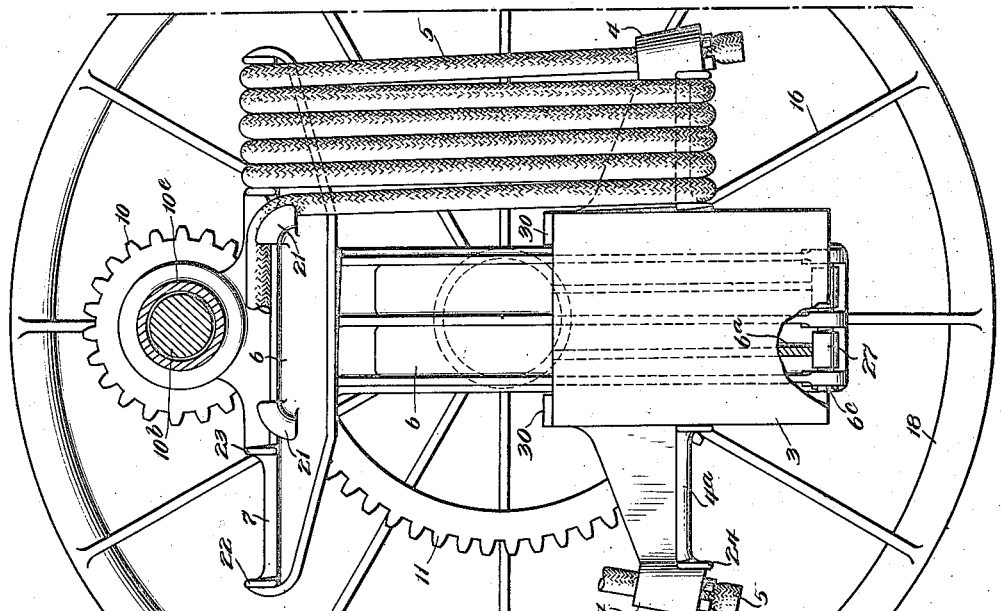

Oct. 23, 1923.
J. V. MARTIN
VEHICLE SHOCK ABSORBER
Filed Aug. 8, 1922
1,471,968
5 Sheets-Sheet 4
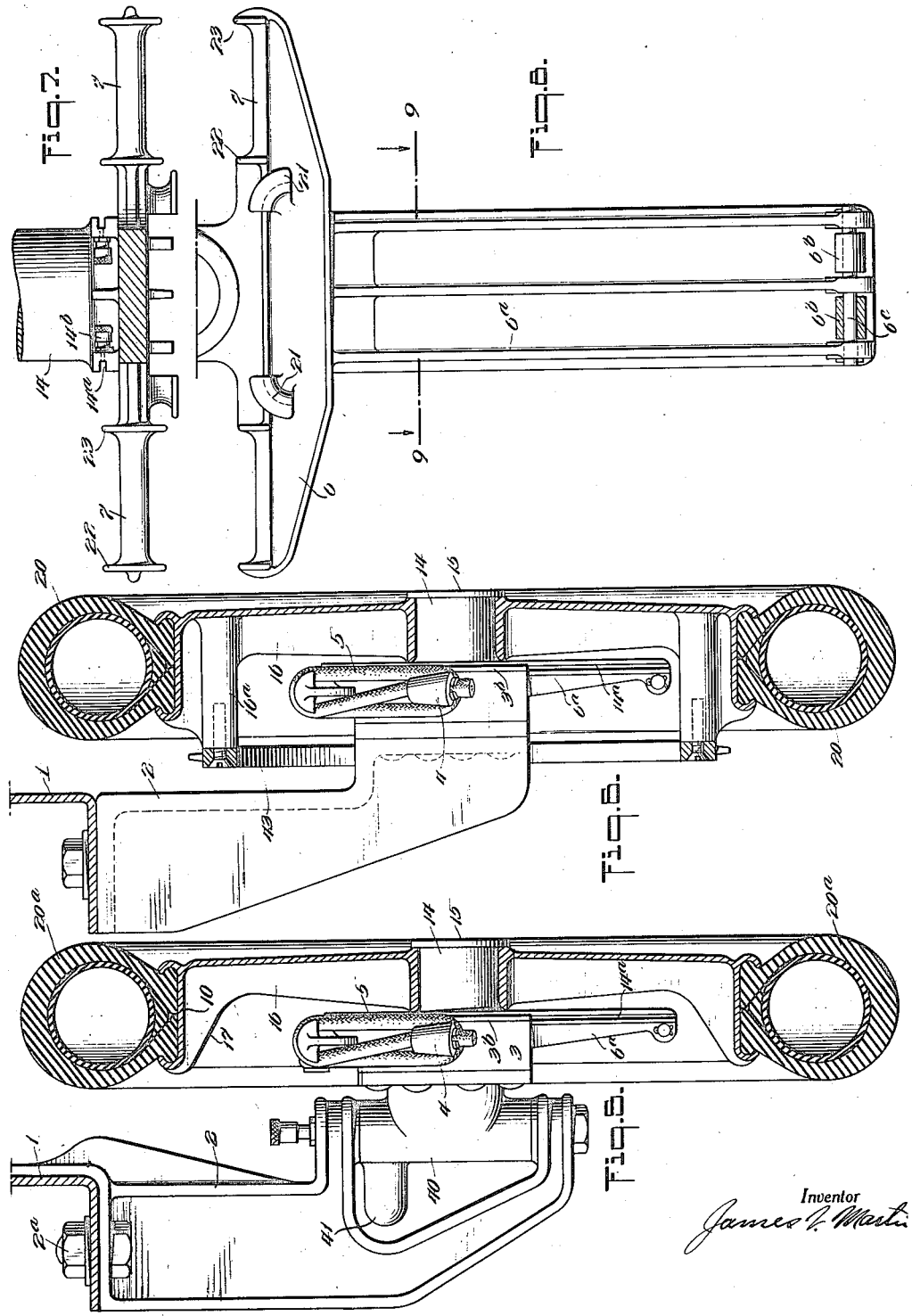
Inventor
James V. Martin

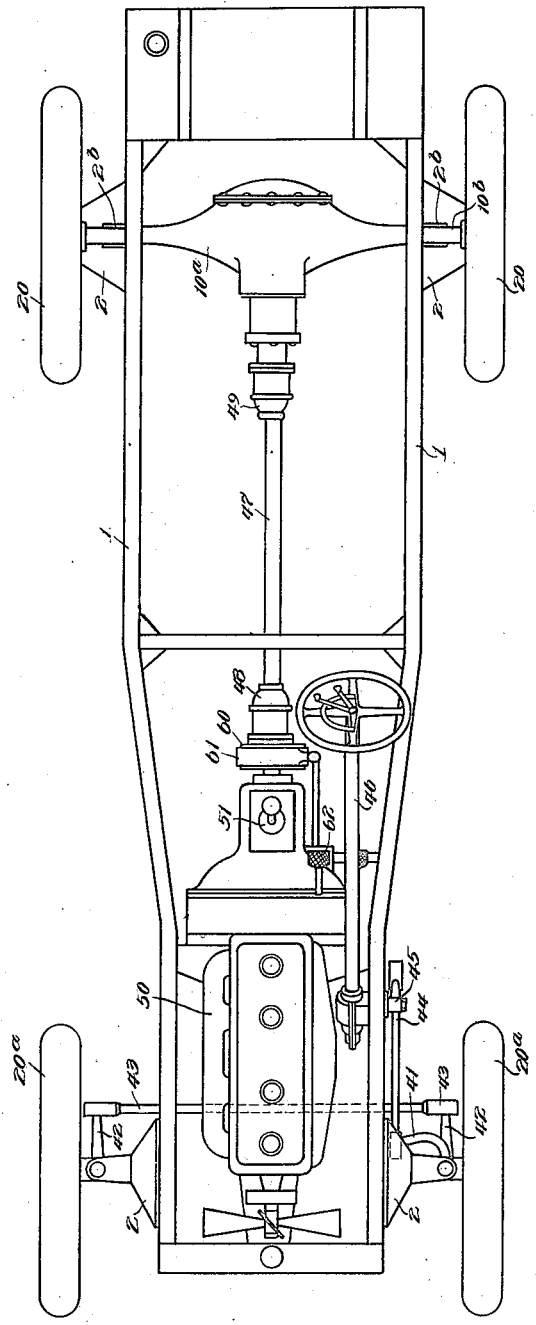

Patented Oct. 23, 1923.

1,471,968

UNITED STATES PATENT OFFICE.

JAMES V. MARTIN, OF GARDEN CITY, NEW YORK.

VEHICLE SHOCK ABSORBER.

Application filed August 8, 1922. Serial No. 580,508.

*To all whom it may concern:*

Be it known that I, JAMES V. MARTIN, a citizen of the United States of America, residing at Garden City, in the county of Nassau and State of New York, have invented a new and useful Vehicle Shock Absorber, of which the following is a specification.

The primary object of my invention is to provide an improved form of vehicle wheel adapted to contain within substantially its tire faces a compact and efficient shockabsorber.

More particularly stated my invention aims to substitute, to a large extent, the use of rubber for springs, and to adapt the chassis or running gear of automobiles and aeroplanes for the efficient and practical disposition of rubber for this purpose.

A further object of my invention is to facilitate the ease with which elastic material may be added or removed as a shockabsorber for vehicles, as the load requirements vary.

A further object of my invention is to provide a simple and effective gripping means to hold the ends of elastic bands from slipping, in their relation to the special requirements of vehicle shockabsorbers.

A further object of my invention is to provide compactly within a vehicle wheel a power reduction drive, thus reducing the weight of the usual power transmission drives to the wheels of motor propelled vehicles.

A further object of the invention is to provide proper lubricating means for the novel wheel shockabsorber and for the reduction drive.

A further object of my invention is to provide an internal wheel shockabsorber for a wheel having a chain sprocket means for driving.

A further object of my invention is to adapt the new type of shockabsorber so that steering the wheel through the said shockabsorber shall be practical.

Further my invention consists in the various constructions and combinations hereinafter described and more particularly pointed out in the subjoined claims.

I attain these objects by the mechanism illustrated in the accompanying drawings, in which—

Figure 1:
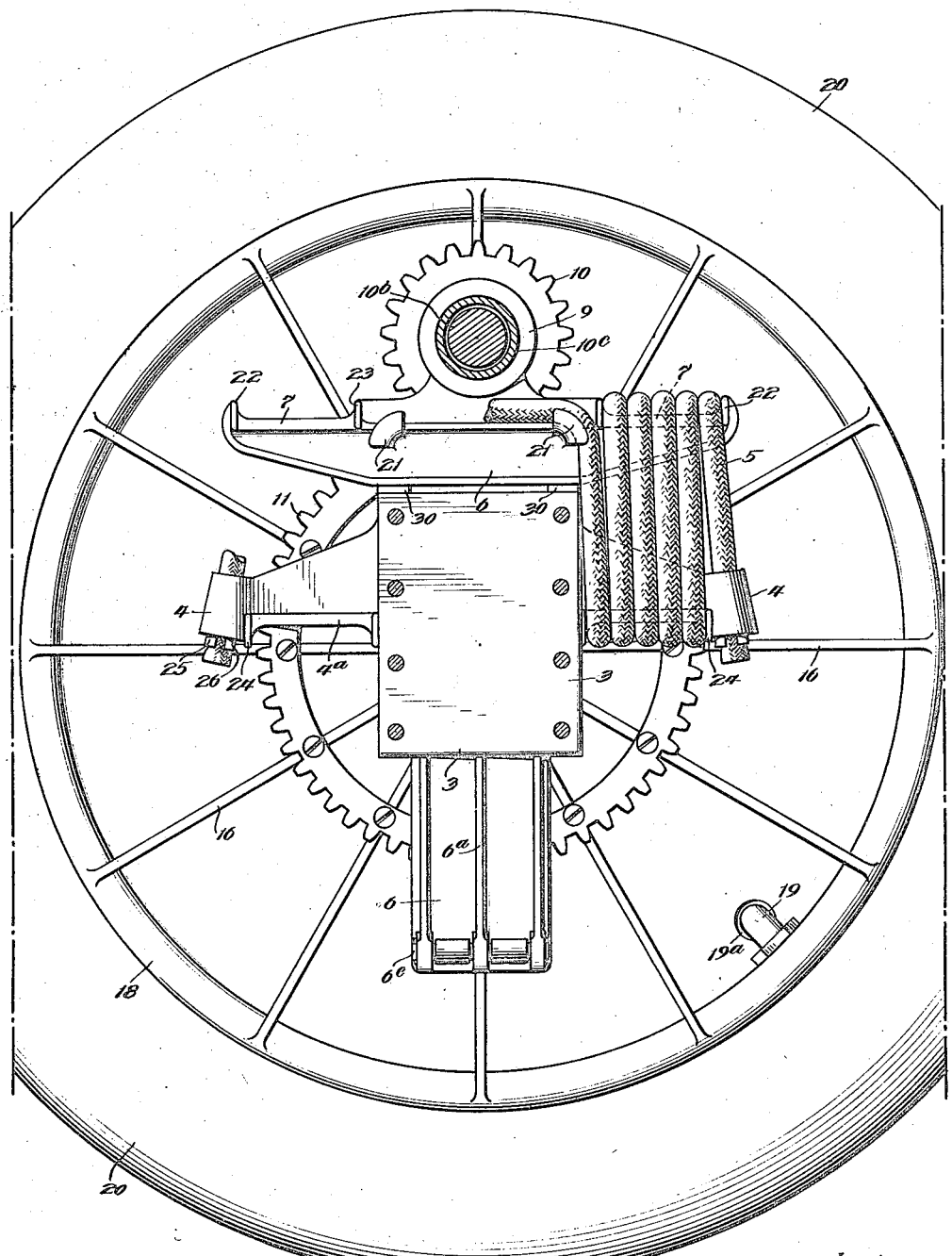
Figures 2, 5:
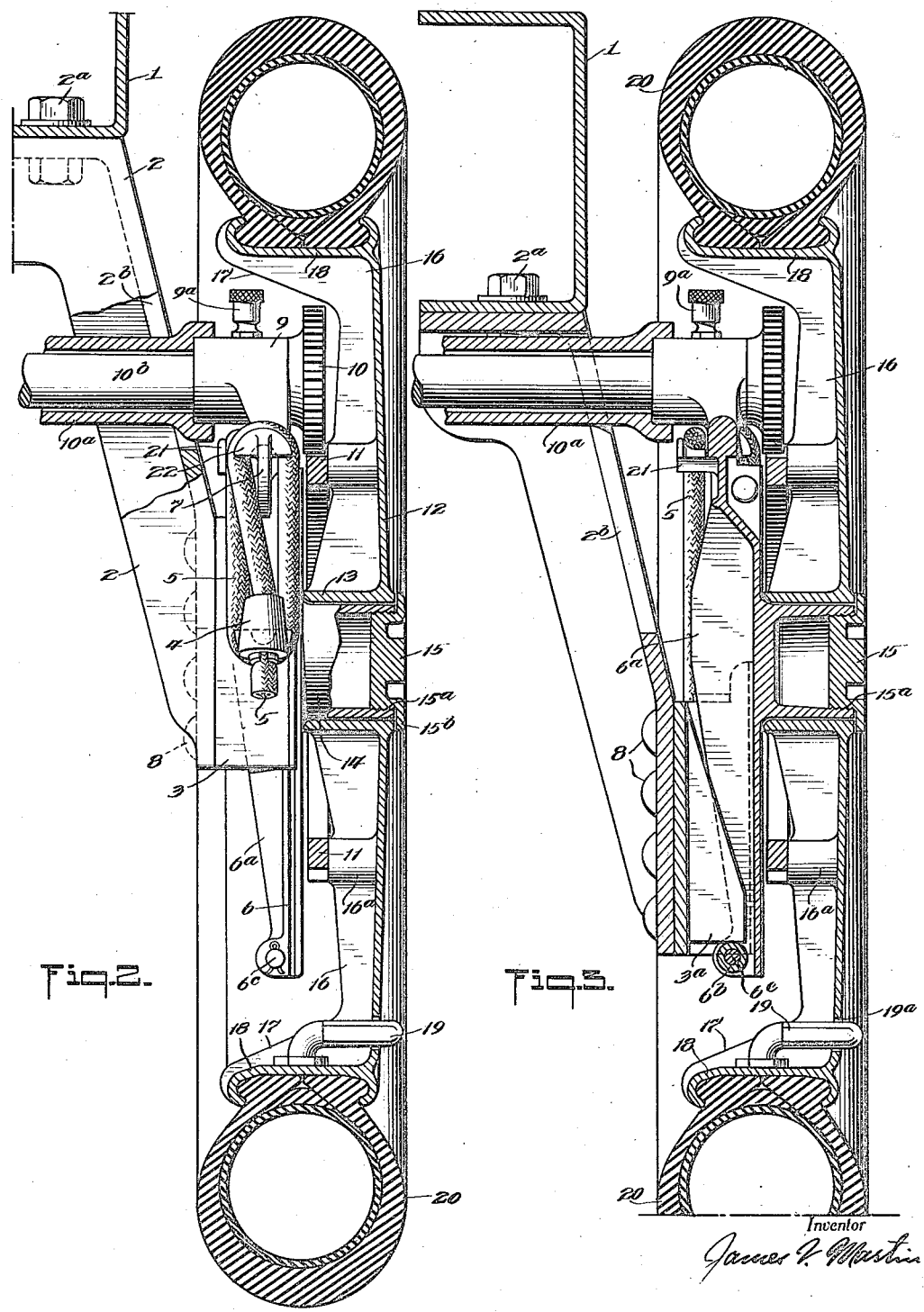

Fig. 1 is a front elevation of my wheel viewed from the inside and showing my novel shockabsorber in normal position to sustain the static load of the vehicle; Fig. 2 is a vertical section of the wheel showing in side elevation the shockabsorber and reduction drive of the wheel; Fig. 3 is a similar section of the wheel showing in section the shockabsorber parts with shockabsorber fully extended; Fig. 4 is another front elevation with part of the elastic element broken away for sake of clearness showing the shockabsorber fully extended and the shockabsorber parts in contact at the stops; Fig. 5 shows the wheel in elevated section and the means of attaching the steering means to steer the wheel; Fig. 6 shows the wheel in elevated section and the method of attaching the chain sprocket ring; Fig. 7 is a view looking down upon the top of the slot casting as shown in Fig. 8 in front elevation; Fig. 9 is a section of the slot casting looking down at the part indicated by broken line 9 9, of Fig. 8 with the addition of the guide casting shown in front elevation in Fig. 10 and in side elevation in Fig. 11; Fig. 12 is a section through the centre of the clamping device on the arm of the guide casting and Fig. 13 is a section of the same clamping device taken on the line 13 13 of Fig. 12; Fig. 14 is a plan view of a typical automobile chassis showing some of the adaptations necessary for the new invention in a particular instance.

Similar numerals refer to similar parts throughout the several views, although these parts may be slightly varied to suit differing relations with other parts.

The frame member 1, of a vehicle is shown rigidly bolted to a connecting member 2, which is securely bolted to the guide casting 3, which carries the clamping arms 4, through which pass the shockabsorber cord or bands 5, which bands or cords loop over and around the arms 7, of the slot casting 6; the bracket 9, attached to the slot casting 6, holds the bearing $10^c$ for the shaft $10^b$ to which is attached the spur gear 10, slightly exaggerated in Fig. 1, and the external casing $10^a$ fits over and is secured to said bracket 9, through which oil feeds to bearing $10^c$ from oil cup $9^a$; 11 is the spur gear meshing with the drive 10, while 12 is the disc provided with ribs 16, and connecting the rim of the wheel 18, with the hub 13, into which the stub axle 14, is telescoped; this stub axle 14 is part of the slot casting 6 and is held in place by hubcap 15, provided with threads 15ª and with a flange 15ᵇ. Ribs 16 are variously adapted for use in addition to strengthening the disc, rim and hub and are provided with special bosses 16ᵇ for means to secure the spur gear 11, or 16ª to secure the sprockets 43; part 17 is an extension of the rib 16 to hold the inner rim flange of rim 18, while 19 is a bent air valve stem adapted to permit ready accessibility through hole 19ª in disc 12, for inflating the tire 20; 21 is a bracket on the face of the slot casting 6, for support of the rubber cord as it passes from one side to the other of said casting, while 22 and 23 show flanges adapted to confine the rubber cords and prevent them leaving the radiused surface of the arms 7; 24 is a flange on the guide casting similar to the flanges 22 and 23; tapered wedges 25 and 26 are shown with smooth and tapered outer surfaces in contact with the inner surface of the hole in arm 4 and with a roughened surface on the inner side of wedges 25 and 26 where they come into contact with the elastic bands 5 which they are designed to grip and hold by sliding on their smooth outer surfaces and thus clamping the cords or bands tighter the harder the latter are pulled; a rubber bumper 30 limits the upward movement of guide casting 3, relative slot casting 6, while the side wise relations of these castings is determined by the guide plate 3ᵈ secured to part 8 and guided in vertical movement in slot 14ª of part 6; oil cup 14ᵇ feeds oil to the said slot 14ª and to the guide 3ᵈ; ribs 3ª strengthen part 3 in vertical direction and ribs 6ª strengthen slot casting 6 in like manner; the rod 6ᶜ is telescoped through holes in the bottom of slot casting 6 and through rubber tubes 27 to make a bumper stop to the downward movement of guide casting 3 relative slot casting 6, taps 3ᵇ secure guide plate 3ᵈ to guide casting 3. The usual type steering part is shown 40, controlled by rod 41. and connecting part 42 which carries the motion through part 43 to the opposite wheel; push and pull rod 44, rocked about bearing 45, is controlled from steering column 46 in the manner now common practice in all auto design; 47—48 and 49 show familiar parts of typical auto transmission drive while the motor is shown 50, in the usual location relative frame 1, and the gear shifts 51. A well known type of brake band is shown 61, about a brake drum 60 on the transmission drive and the said brake is controlled in the usual manner through foot lever 62, other parts not specifically numbered will be readily recognized as typical of present day auto practice.

The operation of my device is as follows:—the parts being assembled as shown in the drawings and supporting the static load of the vehicle with guide casting 3 at its upmost position as shown in Figs. 1—2— 5 and 6 the shocks due to the vehicle alighting as an aeroplane or rolling as an automobile are absorbed by the elastic bands 5 which permit large relative movement of the guide and slot castings in a vertical direction while the wheel itself is free to rotate in the usual manner about the stub axle 14 which is part of the slot casting 6; this movement of the castings and the wheel is also consistent with the driving of the wheel by means of either the spur gear drive shown in Figs. 1—2 and 3 or by chain and sprocket as indicated in Fig. 6. As previously stated the rubber tubes 27 limit the downward motion of the guide casting 3 and it is believed that the drawings are sufficiently clear with this explanation to be readily understood. The wheel resulting from this invention will be seen as a vast improvement over the present spring suspension of vehicles generally, for if a spring is strong enough to support a vehicle loaded it usually has little shock-absorber quality for light loads, while the rubber in the form shown has proved able to replace springs 100 times of greater weight for the same maximum load and the rubber will respond more readily to light loads; furthermore the form of the invention shown permits ready variation of the amount of rubber to be applied by lessening the turns about the radiused parts of the castings. The severe rebound of springs can be eliminated by this invention since the rubber actually absorbs the shock while springs seem merely to deflect it.

Having thus described my invention in specific application, I do not care to be limited to the special construction shown, but what I claim is:

1. In combination with a vehicle running or alighting device, elastic bands for use as shockabsorbers and wedging means of gripping the ends of the said bands to hold same against movement.

2. The combination in a vehicle shockabsorber of two relatively movable parts, one of said parts provided with radiused portions, said radiused portions wrapped with loops of an elastic band and one of said parts provided with a tapered gripping device adapted to grip and hold an end of the said elastic band against movement.

3. In combination with a vehicle running gear or chassis, shockabsorber parts yieldingly bound together by elastic bands and one of said parts provided with tapered wedges adapted to grip and hold the ends of said bands against slipping.

4. In combination with the chassis or running gear of a vehicle, elastic bands for use as shockabsorbers and a gripping means for holding the ends of said bands, said means including a tapered hole having a smooth surface and wedges shaped to fit the said tapered hole, said wedges having smooth surfaces in contact with the said surface of the said hole and roughened interior surfaces adapted to grip and hold the said elastic bands.

5. A vehicle shock absorber comprising two rounded members wrapped with multiple loops of an elastic band and a tapered gripping device attached to one of the said rounded members to hold the end of said elastic band against movement.

6. The combination in a motor vehicle of a body, a ground wheel and supports connecting said body and wheel diagonally, said supports converging near the wheel center and there rigidly attached to a shock absorber member provided with rounded portions and wrapped with elastic bands and a tapered gripping device to hold the ends of the said bands.

7. In combination with an axle-less type vehicle, diagonal braces supporting the vehicle body on a vehicle wheel and the lower ends of the said braces made rigid with a shockabsorber member, said member guided for relative movement upon a second shockabsorber member and said second shockabsorber member attached to a stub axle, the said first and second members wrapped with loops of an elastic band and one of said members including a tapered gripping means for holding an end of the said band.

JAMES V. MARTIN.